United States Patent
Dickerson et al.

(10) Patent No.: US 7,624,176 B2
(45) Date of Patent: Nov. 24, 2009

(54) METHOD AND SYSTEM FOR PROGRAMMATICALLY GENERATING SYNTHETIC TRANSACTIONS TO MONITOR PERFORMANCE AND AVAILABILITY OF A WEB APPLICATION

(75) Inventors: Scott Stephen Dickerson, Austin, TX (US); James Nicholas Klazynski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 10/965,214

(22) Filed: Oct. 14, 2004

(65) Prior Publication Data

US 2006/0085537 A1    Apr. 20, 2006

(51) Int. Cl.
*G06F 15/173* (2006.01)
(52) U.S. Cl. ............... 709/224; 709/223; 709/220; 707/100
(58) Field of Classification Search ............... 709/224; 707/100
See application file for complete search history.

(56) References Cited

U.S. PATENT DOCUMENTS

| | | | |
|---|---|---|---|
| 6,317,787 B1 | 11/2001 | Boyd et al. | 709/224 |
| 6,374,359 B1 | 4/2002 | Shrader et al. | 713/201 |
| 6,477,483 B1 | 11/2002 | Scarlat et al. | 702/186 |
| 6,549,944 B1 | 4/2003 | Weinberg et al. | 709/224 |
| 6,587,969 B1 | 7/2003 | Weinberg et al. | 714/46 |
| 6,631,411 B1 | 10/2003 | Welter et al. | 709/224 |
| 6,654,699 B2 | 11/2003 | Millard | 702/108 |
| 6,701,363 B1 | 3/2004 | Chiu et al. | 709/224 |
| 6,789,049 B2 * | 9/2004 | Gross et al. | 702/186 |
| 2002/0040400 A1 * | 4/2002 | Masters | 709/228 |
| 2002/0143933 A1 * | 10/2002 | Hind et al. | 709/224 |
| 2004/0030703 A1 * | 2/2004 | Bourbonnais et al. | 707/100 |

OTHER PUBLICATIONS

Technical Standard Application Response Measurement (ARM) Issue 4.0—Java Binding, The Open Group, Oct. 2003, ISBN: 1-931624-36-4, Document No. C037, pp. Cover—84.

* cited by examiner

*Primary Examiner*—Jeffrey Pwu
*Assistant Examiner*—Sulaiman Nooristany
(74) *Attorney, Agent, or Firm*—Yee & Associates, P.C.; Jeffrey S. LaBaw (57) ABSTRACT

A method, apparatus, and computer instructions for programmatically generating synthetic transactions to monitor performance and availability of a Web application. The mechanism of the present invention may be implemented as a Java 2 Platform Enterprise Edition (J2EE) transaction, wherein the J2EE application is instrumented with just-in-time-instrumentation (JITI). A JITI probe determines if a customer request object contains a cookie. If not, the JITI probe inserts a cookie into the response object. The cookie is used to track URIs visited by the customer. An algorithm is used to identify the baseline customer transaction path based on the URIs in the cookie. All baseline customer transaction paths for all customers are then correlated to form a unique transaction, wherein the unique transaction comprises the most common tasks performed in the Web application. The Web application may then be monitored by programmatically recording and scheduling playback of the unique transaction.

19 Claims, 5 Drawing Sheets

METHOD AND SYSTEM FOR PROGRAMMATICALLY GENERATING SYNTHETIC TRANSACTIONS TO MONITOR PERFORMANCE AND AVAILABILITY OF A WEB APPLICATION

BACKGROUND OF THE INVENTION

1. Technical Field

The present invention relates generally to an improved data processing system. In particular, the present invention relates to a method, apparatus, and computer instructions for programmatically generating synthetic transactions to monitor performance and availability of a Web application.

2. Description of Related Art

Performance monitoring is often used in optimizing the use of software in a system. A performance monitor is generally regarded as a facility incorporated into a processor to assist in analyzing selected characteristics of a system by determining a machine's state at a particular point in time. One method of monitoring system performance is to monitor the system using a transactional-based view. In this manner, the performance monitor may access the end-user experience by tracking the execution path of a transaction to locate where problems occur. Thus, the end user's experience is taken into account in determining if the system is providing the service needed.

Tivoli Monitoring for Transaction Performance™ (hereafter TMTP) is a centrally managed suite of software components that monitor the availability and performance of Web-based services and operating system applications. TMTP captures detailed transaction and application performance data for all electronic business transactions. With TMTP, every step of a customer transaction as it passes through an array of hosts, systems, application, Web and proxy servers, Web application servers, middleware, database management software, and legacy back-office software, may be monitored and performance characteristic data compiled and stored in a data repository for historical analysis and long-term planning. One way in which this data may be compiled in order to test the performance of a system is to simulate customer transactions and collect "what-if" performance data to help assess the health of electronic business components and configurations. TMTP provides prompt and automated notification of performance problems when they are detected.

With TMTP, an electronic business owner may effectively measure how users experience the electronic business under different conditions and at different times. Most importantly, the electronic business owner may isolate the source of performance and availability problems as they occur so that these problems can be corrected before they produce expensive outages and lost revenue.

As customers need to ensure that their Web sites are available and meet performance targets, TMTP permits users to manually record and playback business transactions occurring on their Web sites. While TMTP allows for recording/playback of business transactions to determine the manner by which a transaction is processed by the various elements of the electronic business, using such manual recordings requires that users understand the common paths that their customers take through their Web site. That is, while TMTP permits a user to record/playback business transactions, no mechanism is present in TMTP for analyzing customer paths through the Web site and using this information with the TMTP product line in order to suggest and automatically generate playback of recorded business transactions.

Therefore, it would be advantageous to have a mechanism for dynamically generating a business transaction recording and programmatically scheduling playback to automatically determine the boundaries of common business transactions and if these transactions meet performance and availability requirements.

SUMMARY OF THE INVENTION

The present invention provides a method, apparatus, and computer instructions for programmatically generating synthetic transactions to monitor performance and availability of a Web application. The mechanism of the present invention may be implemented as a Java 2 Platform Enterprise Edition (J2EE) transaction, wherein the J2EE application is instrumented with on-the-fly just-in-time-instrumentation (JITI). When a request object is received from a customer, a JITI probe determines if the request object contains a cookie. If not, the JITI probe inserts a cookie into the response object. The cookie is used to track URIs visited by the customer. An algorithm is used to identify the baseline customer transaction path based on the URIs in the cookie. All baseline customer transaction paths for all customers are then correlated to form a unique synthetic transaction, wherein the unique transaction comprises the most common tasks performed in the Web application. The Web application may then be monitored by programmatically recording and scheduling playback of the unique transaction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
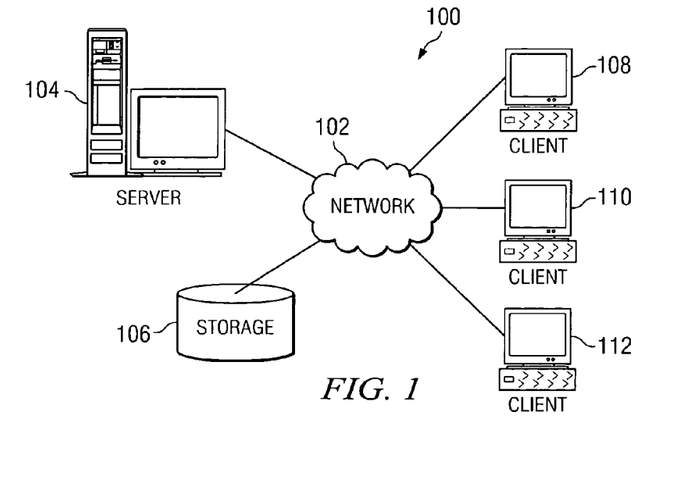
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
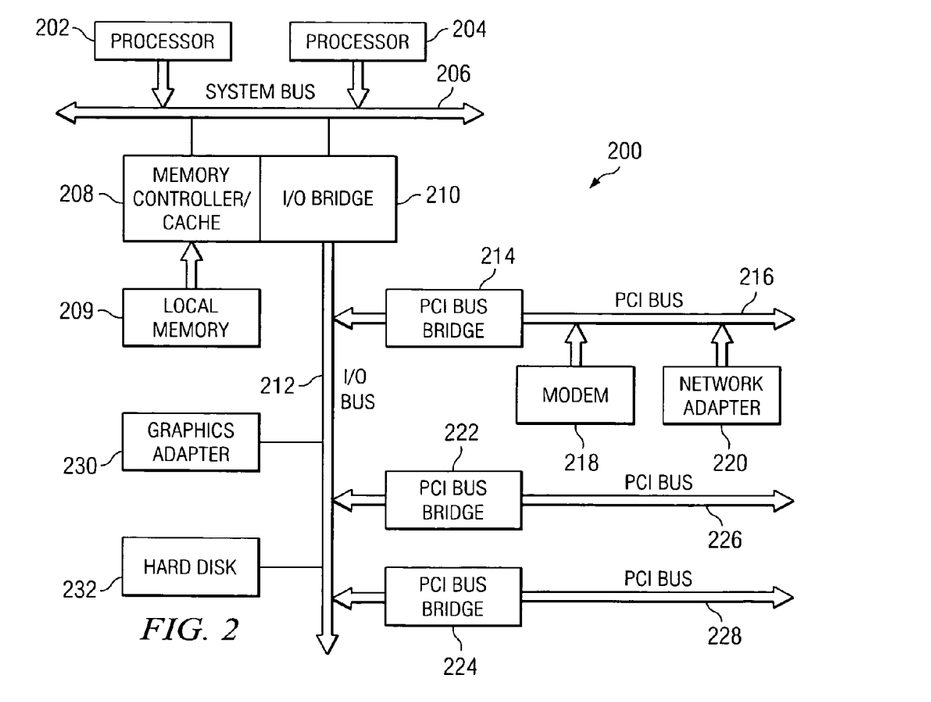
FIG. 2 is an exemplary diagram of a server computing device which may be used to send transactions to elements of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
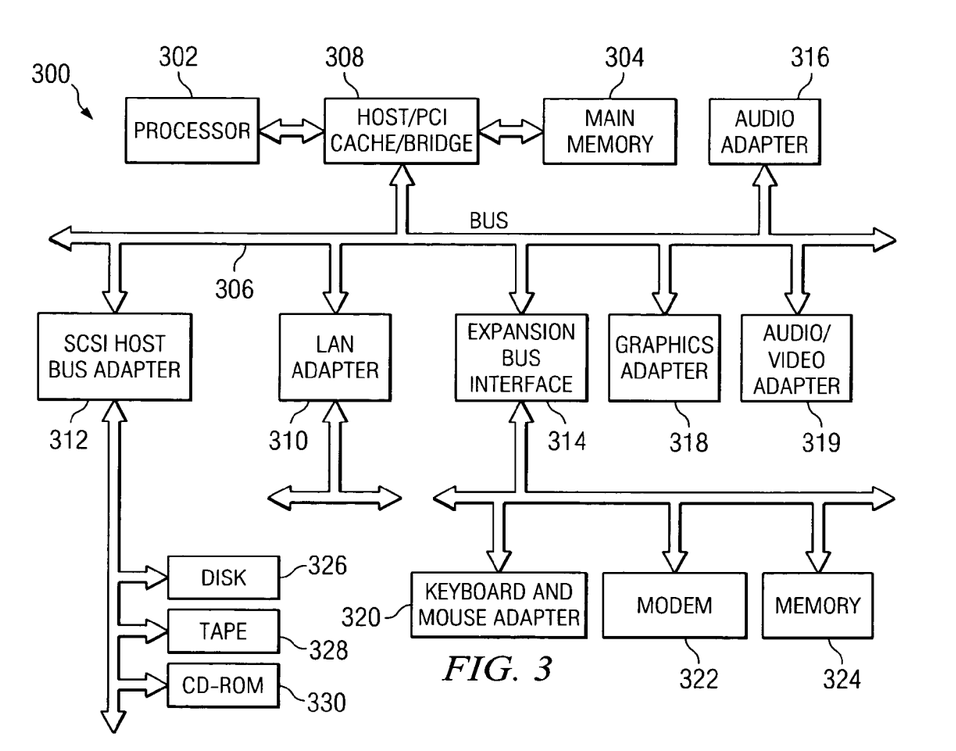
FIG. 3 is an exemplary diagram of a client computing device upon which elements of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

One or more servers, such as server 104, may provide Web services of an electronic business for access by client devices, such as clients 108, 110 and 112. With the present invention, a transaction performance monitoring system is provided for monitoring performance of components of the Web server and its enterprise back end systems in order to provide data representative of the enterprise business' performance in handling transactions. In one exemplary embodiment of the present invention, this transaction performance monitoring system is IBM Tivoli Monitoring for Transaction Performance™ (TMTP) which measures and compiles transaction performance data including transaction processing times for various components within the enterprise system, error messages generated, and the like.

The present invention allows for determining the boundaries of the most common business transactions on a Web site and using this information to ensure that the Web site is available and meets performance targets. The present invention builds upon existing transaction performance monitoring systems to provide an analyzing mechanism for programmatically generating synthetic transactions to monitor performance and availability of a Web application. In this manner, the mechanism of the present invention allows for analyzing customer paths through a Web site and using this information in order to suggest and automatically generate playback of recorded business transactions.

In particular, the mechanism of the present invention uses just-in-time-instrumentation (JITI) to dynamically insert cookies into a Web site monitored by a TMTP application. A JITI probe may be used to intercept calls to the application and determine if the customer request object already contains a cookie. If a cookie is not found in the request object, the JITI probe inserts a cookie into the response object sent to the customer browser. These cookies are used to track the Uniform Resource Identifiers (URIs) visited by customers and are then stored in a central repository.

Information obtained from a cookie, as well as all of the URIs to which the cookie was passed, may then be analyzed to determine the path that a particular customer took when navigating through the Web site. Once multiple customer paths have been obtained, these customer paths may then be correlated together to determine the lowest common denominator, or "global transaction path", of these customer traffic patterns. In other words, relative weights are assigned to each path based on the number of customers who have traversed a particular path, and these weights allow for identifying the most common tasks performed on the Web site.

Once a global transaction path has been identified, the path may be broken down into multiple discrete business transactions. These unique business transactions consist of a list of URIs in a particular sequence with a particular subset of parameters. From these unique transactions, recordings of business transactions may be dynamically generated. In addition, these recordings may be used to programmatically schedule playback of these unique transactions to automatically ensure that these customer transactions meet performance and availability requirements. In this manner, problems related to availability and performance in customer business transactions may be brought to a system administrator's attention in order to aid in resolving problems in the enterprise system.

Furthermore, these transactions may be shown to system administrator for confirmation or programmatically scheduled for playback by a playback agent. Thresholds for availability violations may also be automatically set so that if any HTTP response code is sent to a customer, an event is thrown to alert the system administrator. Likewise, thresholds for performance violations can be deduced by adding up the average response times received for each URI in the transaction list and dynamically creating a threshold at some user-specified percentage above these response times.

Moreover, the frequency and the time of the synthetic transaction playback may also be determined through an analysis of the usage patterns on the Web site. For example, if a certain business transaction occurs most frequently between the 7:00 and 8:00 hour, the synthetic transaction playback may be programmatically scheduled to perform between the 5:00-7:00 hours. An advantage of utilizing this kind of information to schedule a transaction playback job is that it serves as an early warning system before customers actually attempt their business critical transactions. Another advantage of using an analysis of usage patterns on the Web site to schedule playback jobs is that the playback will not slow down actual customer transactions, since the playback job will stop before the majority of the customer transactions hit the Web site. In addition, analyzing the frequency of a particular user pattern allows for prioritizing business transactions which may help determine how often a playback should be scheduled.

Figure 4:
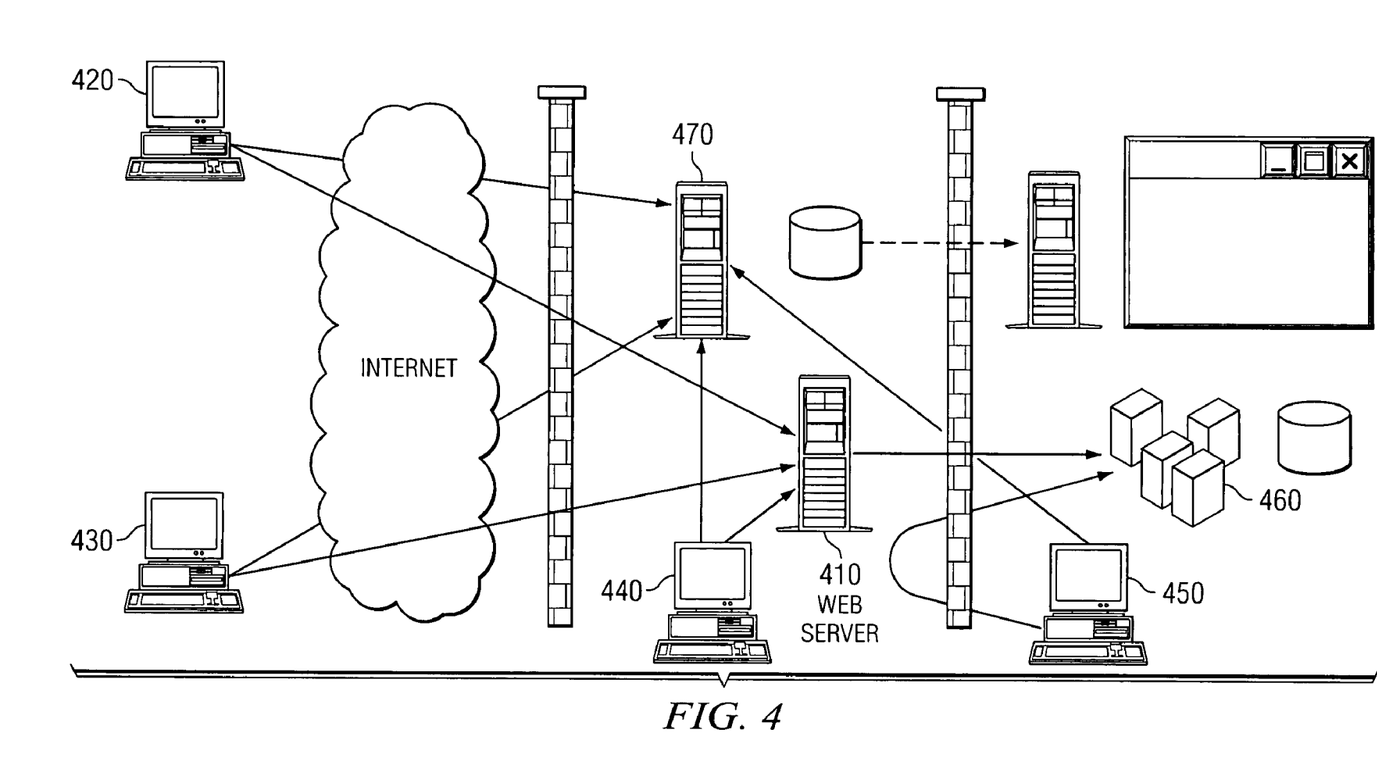
FIG. 4 is a conceptual diagram of an electronic business system in accordance with the present invention.

Turning now to FIG. 4, an exemplary diagram of an electronic business system in accordance with a known transaction performance monitoring architecture is shown. Client devices 420-450 may communicate with Web server 410 in order to obtain access to services provided by the back-end enterprise computing system resources 460. TMTP system 470 is provided for monitoring the processing of transactions by the Web server 410 and enterprise computing system resources 460.

Web server 410, enterprise computing system resources 460 and TMTP system 470 are part of an enterprise system. Client devices 420-450 may submit requests to the enterprise system via Web server 410, causing transactions to be created. The transactions are processed by Web server 410 and enterprise computing system resources 460 with TMTP system 470 monitoring the performance of Web server 410 and enterprise computing system resources 460 as they process the transactions.

This performance monitoring involves collecting and storing data regarding performance parameters of the various components of Web server 410 and enterprise computing system resources 460. For example, monitoring of performance may involve collecting and storing information regarding the amount of time a particular component spends processing the transaction, a SQL query, component information including class name and instance id in the JAVA Virtual Machine (JVM), memory usage statistics, any properties of the state of the JVM, properties of the components of the JVM, and/or properties of the system in general.

The components of web server 410 and enterprise computing system resources 460 may include both hardware and software components. For example, the components may include host systems, JAVA Server Pages, servlets, entity beans, Enterprise Java Beans, data connections, and the like. Each component may have its own set of performance characteristics which may be collected and stored by TMTP system 470 in order to obtain an indication as to how the enterprise system is handling transactions. More information regarding the manner by which TMTP system 470 collects performance data, stores it, and uses it to generate reports and transaction graph data structures may be obtained from the Application Response Measurement (ARM) Specification, version 4.0, which is hereby incorporated by reference.

Figure 5:
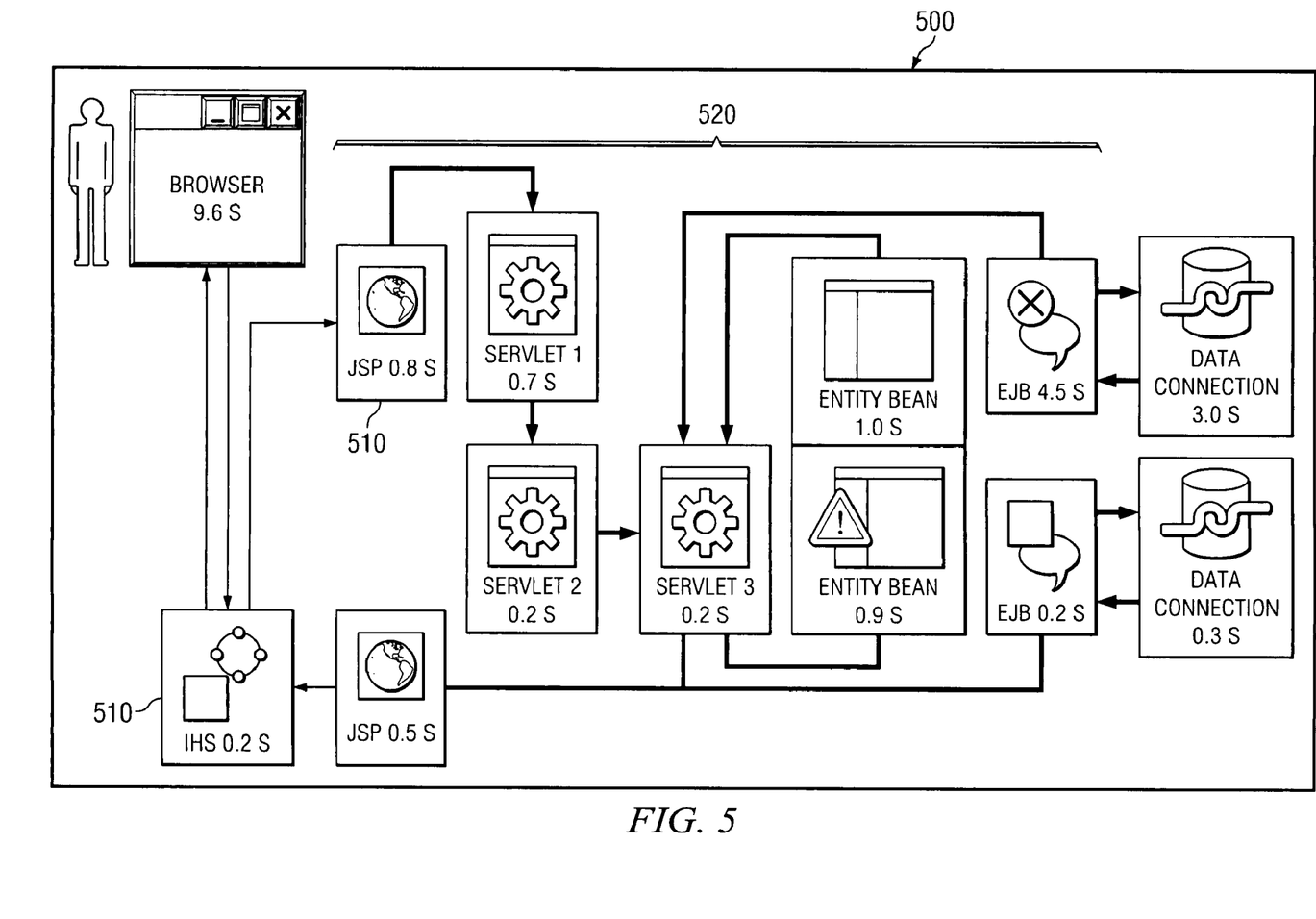
FIG. 5 is an exemplary diagram illustrating the primary operational elements of the present invention.

FIG. 5 is an exemplary diagram illustrating a graphical user interface representation of a transaction graph data structure. Graph data structure representation 500 includes a plurality of nodes 510 representing various components of enterprise system 520 through which a transaction is processed. Nodes 510 represent various components including the browser of the client device and the Internet host system (which are indicated as external to enterprise system 520), JAVA Server Pages, servlets, entity beans, Enterprise JAVA Beans, and data connections (which are also indicated as being external to enterprise system 520). Arrows between nodes 510 represent data flow from component to component as the transaction is processed.

Various indicators may be provided associated with each iconic representation of the enterprise system components. These indicators may be used to identify the components where additional attention of the system administrator(s) is warranted. For example, these indicators may identify components where collected performance data indicates an error, less than acceptable performance, potential bottlenecks, and the like.

Figure 6:
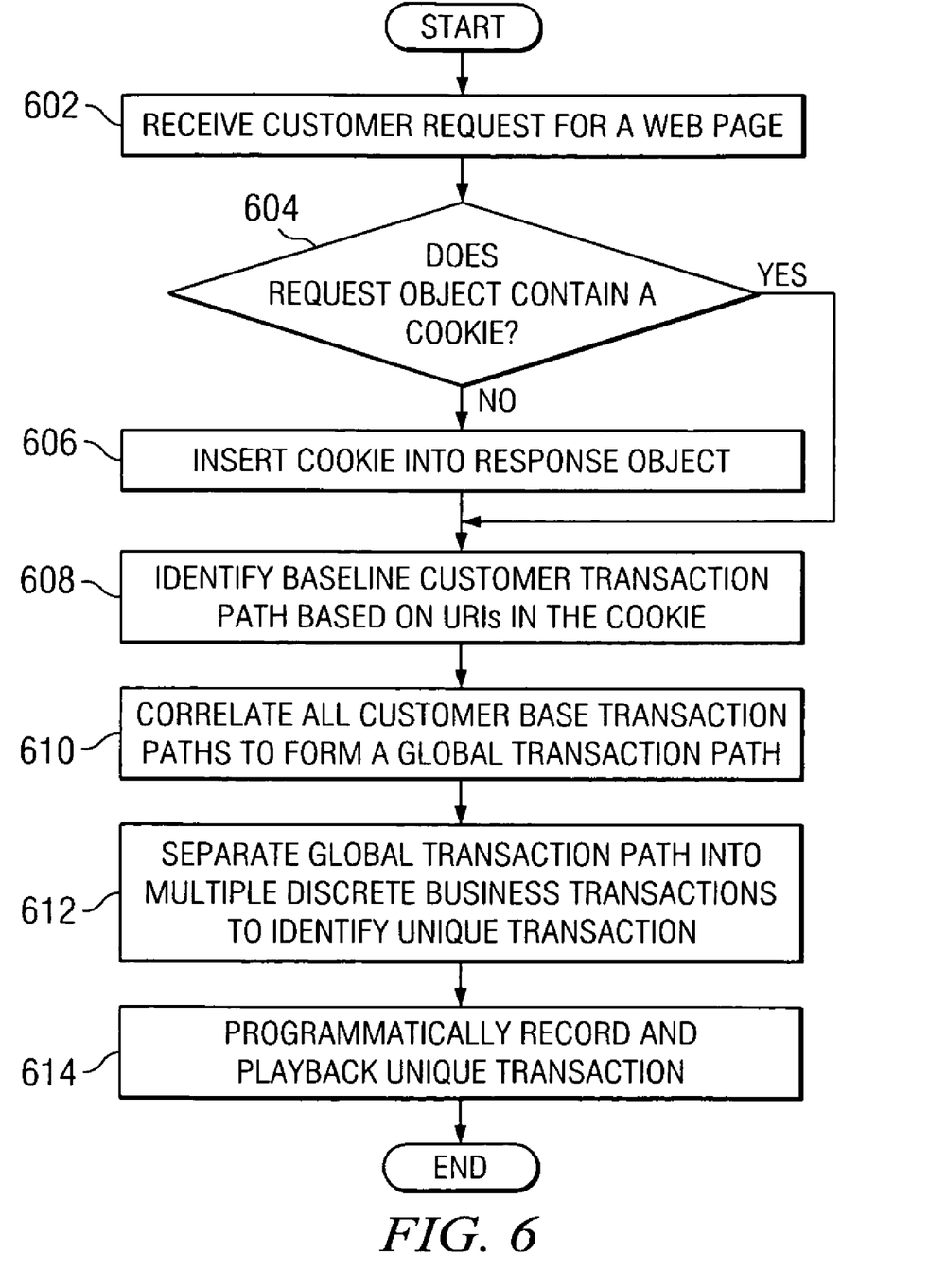
FIG. 6 is a flowchart outlining an exemplary operation for programmatically generating synthetic transactions to monitor performance and availability of a Web application in accordance with a preferred embodiment of the present invention.

Turning now to FIG. 6, a flowchart outlining an exemplary operation for programmatically generating synthetic transactions to monitor performance and availability of a Web application in accordance with a preferred embodiment of the present invention is shown. The process illustrated in FIG. 6 may be implemented as a Java 2 Platform Enterprise Edition (J2EE) transaction in a data processing system, such as data processing system 200 in FIG. 2. In this illustrative example, a J2EE application is instrumented with on-the-fly just-in-time-instrumentation (JITI). This instrumentation allows a focus on data of interest to the operations staff to be collected without application interruption.

The process begins with a customer requesting a page in a Web site (step 602). For example, a customer wants to view a page in a Web site and sends an HTTPRequest object to the J2EE application. If the J2EE application is instrumented with JITI, a JITI probe, which is attached to an HTTP servlet, may determine if the HTTPRequest object, sent by the customer's browser, contains a cookie (step 604). The JITI probe is a program that is inserted at a customizable entry point URI for the purpose of monitoring or collecting data about a business transaction.

For example, the JITI probe may intercept calls to the J2EE application and check the customer request for the presence of a cookie. If a cookie is found, the process skips to step 608 below. If a cookie is not found, the JITI probe generates a unique cookie and dynamically inserts it into the HTTPResponse object of the servlet (step 606). The cookie is used to track uniform resource identifiers (URIs) visited by the customer, and the cookie value is incremented based on the number of URIs visited. For instance, as the customer navigates through the J2EE application, the customer's browser sends the inserted cookie back to all monitored URIs the customer visits. As the customer visits other URIs on the Web site, the cookie value will be incremented with each subsequent hit on a monitored URI. Each URI and cookie value may be uploaded to a central repository, where a list of URIs that the cookie has visited is compiled in the order that the customer visited the Web site pages.

Next, a baseline customer transaction path is identified for a particular customer (step 608). This step may be performed using a shortest path algorithm. For example, the baseline customer path contains the minimum number of URIs to describe the customer's business transaction. The algorithm is conducted within each cookie's list of URIs. As each URI with a unique set of GET or POST parameters keys is considered a unique URI and multiple parameter values are considered equivalent, the shortest path algorithm for each cookie is conducted from the first URI to the last URI visited by a user, with all weights for each URI set to 1. In this manner, the shortest path algorithm reduces the list of URIs to the "base transaction" for the customer.

For instance, if a customer's transaction path looked like this:

A->B->A->B->C, the shortest path algorithm would reduce the customer's transaction path to this:

A->B->C.

Next, the identified base transaction paths may be correlated into a global transaction path (step 610). To create a global transaction path, the individual base transaction paths for all of the customers are correlated together, with relative weights assigned to each path based on the number of users who have traversed this path. Optional steps may be removed by applying a longest path or critical path algorithm to the global transaction path.

For instance, a majority of customers navigated through the Web site in the following manner:

A->B->C while other customers navigated through the Web site in a different manner:

A->B->D->C.

Since the majority of customers traversed the B->C path, the weight of the B->C line would be greater than the weight of the B->D->C line. Consequently, the global transaction path would be:

A->B->C.

Next, the global transaction path is separated into multiple discrete business transactions to identify a unique synthetic transaction (step 612). This step may be performed by first identifying the last URI in each customer's cookie list. Once all of these last URIs are identified, the number of each URI is counted to determine an "exit count" for each URI. The exit count allows for identifying how many customers ended their transaction at a particular URI. In other words, if 50 customers exited the Web site from node E, the exit count for node E would be 50. In this manner, each node in the global transaction path may be marked with an exit count.

A user may set the number of unique transactions to automatically generate when the customizable entry point URI is identified. For example, if node A is the entry point, and the user wants to automatically generate three unique transactions, the three nodes with the highest exit count are identified and the global transaction path is broken down into two programmatic transactions.

For instance, if the global transaction path looked like the following path, where the number at the top is the number of users who exited at each node:

| (200) | (150) | (30) | (200) | (20) | (100) |
|-------|-------|------|-------|------|-------|
| A->   | B->   | C->  | E->   | F->  | G     | and the user requests three transactions be derived from this path, the unique transactions programmatically generated would be as follows:

A->B

A->B->C->E

A->B->C->E->F->G

Since nodes B, E, and G contain the three highest exit counts, the unique transactions generated reflect these counts according to the user's requests. Note that although node A contains one of the highest exit counts, the A-only transaction is ignored when generating the unique transactions since only multiple URI transactions are of interest to the user.

Once a unique transaction has been identified, this information may be used to programmatically record and playback of the unique transaction (step 614). Dynamically generated recordings of the unique transaction may be performed, and these recordings may then be used to programmatically playback the unique transaction at scheduled intervals to aid in identifying and resolving problems in the enterprise system.

In addition, usage patterns on the Web site may be analyzed to determine when and how often to schedule the synthetic transaction playback. Utilizing usage patterns to schedule a transaction playback job serves as an early warning system before customers actually attempt their business critical transactions. The playback will not slow down actual customer transactions, since the playback job may be scheduled to stop before the majority of the customer transactions hit the Web site. In addition, analyzing the frequency of a particular user pattern may allow for prioritizing business transactions by helping determine how often a playback should be scheduled.

Furthermore, thresholds for availability violations may be automatically set so that if any HTTP response code is sent to a customer, an event is thrown to alert the system administrator. Likewise, thresholds for performance violations may be deduced by adding up the average response times received for each URI in the transaction list and dynamically creating a threshold at some user-specified percentage above these response times.

Thus, the present invention provides a method, apparatus, and computer instructions for programmatically generating synthetic transactions to monitor performance and availability of a Web application. The present invention provides an advantage over current transaction monitoring systems by providing new and improved functionality which allows for analyzing customer paths through a Web site and using this information in order to suggest and automatically generate playback of recorded business transactions. These recordings may be used to programmatically schedule playback of these unique transactions to automatically ensure that these customer transactions meet performance and availability requirements. In this manner, problems related to availability and performance in customer business transactions may be brought to a system administrator's attention in order to aid in resolving problems in the enterprise system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for programmatically generating synthetic transactions for use in monitoring performance and availability of a Web application, comprising:
    responsive to a determination that a request object does not contain a cookie, dynamically inserting a cookie into a response object, wherein the cookie is used to track uniform resource identifiers visited by a customer;
    identifying a baseline customer transaction path of the Web application based on the uniform resource identifiers visited by a customer, in the cookie; correlating the baseline customer transaction path with baseline transaction paths of other customers to form a global transaction path; and
    generating a unique synthetic transaction from the global transaction path, wherein the unique synthetic transaction comprises most common tasks performed in the Web application.

2. The method of claim 1, further comprising the step of monitoring performance of the Web application by programmatically recording and scheduling playback of the unique synthetic transaction at a desired frequency.

3. The method of claim 1, further comprising:
    removing optional transactions from the unique synthetic transaction, wherein optional transactions comprise tasks other than the most common tasks performed in the Web application.

4. The method of claim 1, wherein the cookie is sent to other uniform resource identifiers visited by the customer in the same Web application.

5. The method of claim 1, wherein a value of the cookie is incremented with each subsequent hit of a uniform resource identifier in the same Web application.

6. The method of claim 1, wherein the request object is a HyperText Transfer Protocol request object.

7. The method of claim 1, wherein a Just In Time Instrumentation probe is used to intercept calls to the Web application and determine if the request object contains a cookie.

8. The method of claim 1, wherein the cookie contains a list of uniform resource identifiers and wherein the uniform resource identifiers are compiled in an order that the customer visited pages in the Web application.

9. The method of claim 1, wherein the baseline customer transaction path is identified using a shortest path algorithm.

10. The method of claim 9, wherein the shortest path algorithm is conducted from the first uniform resource identifier to the last uniform resource identifier visited by the customer.

11. The method of claim 9, wherein the shortest path algorithm determines the minimum number of uniform resource identifiers for describing the customer's transaction path by setting all weights for each uniform resource identifier to one.

12. The method of claim 1, wherein a unique synthetic transaction path is determined by assigning relative weights to each customer transaction path based on a number of users who have traversed this path.

13. The method of claim 1, wherein the global transaction path is separated into multiple discrete business transactions by identifying a last uniform resource identifier in each cookie and counting each uniform resource identifier identified to determine an exit count for each uniform resource identifier.

14. The method of claim 13, wherein the exit count allows for identifying a number of customers ending their transaction at a particular uniform resource identifier.

15. The method of claim 1, wherein the unique synthetic transaction is scheduled for playback based on analysis of usage patterns on the Web application.

16. The method of claim 15, wherein analysis of usage patterns for scheduling playback is used to provide performance information prior to customers attempting business critical transactions.

17. The method of claim 15, wherein analysis of usage patterns for scheduling playback is used for scheduling playback jobs at times least affecting customer transactions.

18. The method of claim 1, further comprising:
automatically setting thresholds for availability violations; and
sending an event to a system administrator if response code is sent to the customer.

19. The method of claim 1, further comprising:
adding average response times received for each URI in a transaction list; and
dynamically creating a performance violation threshold at a user-specified percentage above the average response times.

* * * * *

UNITED STATES PATENT AND TRADEMARK OFFICE
CERTIFICATE OF CORRECTION

PATENT NO. : 7,624,176 B2  Page 1 of 1
APPLICATION NO. : 10/965214
DATED : November 24, 2009
INVENTOR(S) : Dickerson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1286 days.

Signed and Sealed this

Twenty-sixth Day of October, 2010

David J. Kappos
*Director of the United States Patent and Trademark Office*